US010395786B2

(12) United States Patent
Lee et al.

(10) Patent No.: US 10,395,786 B2
(45) Date of Patent: Aug. 27, 2019

(54) MAGNETOSTRICTIVE WIRE CONTROL ROD POSITION INDICATOR

(71) Applicant: Korea Atomic Energy Research Institute, Daejeon (KR)

(72) Inventors: Jae Seon Lee, Daejeon (KR); Jong-Wook Kim, Daejeon (KR); Keung Koo Kim, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 872 days.

(21) Appl. No.: 15/018,551

(22) Filed: Feb. 8, 2016

(65) Prior Publication Data

US 2016/0240272 A1 Aug. 18, 2016

(30) Foreign Application Priority Data

Feb. 13, 2015 (KR) ........................ 10-2015-0022310

(51) Int. Cl.
*G21C 7/12* (2006.01)
*G21C 17/12* (2006.01)
*G01D 5/48* (2006.01)

(52) U.S. Cl.
CPC ............... *G21C 17/12* (2013.01); *G21C 7/12* (2013.01); *G01D 5/485* (2013.01)

(58) Field of Classification Search
CPC .......... G21C 7/12; G21C 17/12; G01D 5/485; G01B 7/003
USPC ...................................... 376/258; 324/207.21
See application file for complete search history.

(56) References Cited

U.S. PATENT DOCUMENTS

| | | | | |
|---|---|---|---|---|
| 4,071,818 | A | 1/1978 | Krisst | |
| 5,333,160 | A * | 7/1994 | Runde .................... | G21C 17/12 376/228 |
| 6,192,096 | B1 | 2/2001 | Ichikawa et al. | |
| 2013/0271120 | A1 | 10/2013 | Reymann | |

FOREIGN PATENT DOCUMENTS

| | | | | |
|---|---|---|---|---|
| JP | 2013-545099 A | | 12/2013 | |
| KR | 10-1197-0017701 | * | 4/1997 | ............. G21C 17/12 |
| KR | 10-2000-0025702 A | | 5/2000 | |

* cited by examiner

*Primary Examiner* — Sharon M Davis
(74) *Attorney, Agent, or Firm* — Knobbe Martens Olson & Bear LLP

(57) ABSTRACT

A magnetostrictive wire control rod position indicator for determining a real-time position of a control rod using a mutual interference effect between a magnetic field formed by supplying a pulse current to a magnetostrictive wire provided inside a protecting tube and a magnetic field formed by a permanent magnet of a drive shaft includes magnet members installed at an upper limit position and a lower limit position of the magnetostrictive wire control rod position indicator to cause magnetic field interference with the permanent magnet of the drive shaft.

6 Claims, 4 Drawing Sheets

MAGNETOSTRICTIVE WIRE CONTROL ROD POSITION INDICATOR

CROSS-REFERENCE TO RELATED APPLICATION

This application claims priority to and the benefit of Korean Patent Application No. 10-2015-0022310, filed on Feb. 13, 2015, the disclosure of which is incorporated herein by reference in its entirety.

BACKGROUND

1. Field

The present disclosure relates to a control rod position indicator used to detect a position of a control rod inserted in a reactor core of a nuclear reactor.

2. Discussion of the Related Technology

Generally, nuclear power generation is a method of generating steam with heat generated through nuclear fission of a nuclear fuel in a reactor core of a nuclear reactor and running a turbine using the steam, thereby producing electricity.

Here, to control the output of the nuclear reactor, the control rod should be inserted into or withdrawn from the reactor core by a control rod drive mechanism to adjust reactivity in the reactor core. For this purpose, it is very important to detect a current position of the control rod configured to adjust the reactivity in the reactor core. In this case, the control rod drive mechanism is provided with a control rod position indicator to detect a real-time position of such a control rod. U.S. Pat. Nos. 4,071,818 and 6,192,096 disclose the relate technology.

SUMMARY

One aspect of the invention is directed to a magnetostrictive wire control rod position indicator capable of precisely measuring a position of a control rod and effectively limiting an operation of a control rod drive mechanism by inserting and withdrawing the control rod to generate signals for upper and lower limit positions.

Another aspect of the present invention is directed to a magnetostrictive wire control rod position indicator capable of generating position signals for an upper limit position and a lower limit position in the magnetostrictive wire control rod position indicator to effectively limit an operation of a control rod drive mechanism in case of emergency by installing permanent magnets or electromagnets at the upper limit position and the lower limit position, respectively, to generate the position signals for the upper limit position and the lower limit position based on the magnetic field interference with a permanent magnet installed in a control rod drive shaft when a control rod is driven in a vertical direction.

An aspect of the present invention provides a magnetostrictive wire control rod position indicator for measuring a real-time position of a control rod using a mutual interference effect between a magnetic field formed by supplying current pulses to a magnetostrictive wire provided inside a protecting tube and a magnetic field formed by a permanent magnet of a control rod drive shaft, which includes a first magnet member and second magnet member installed at an upper limit position and a lower limit position of the magnetostrictive wire control rod position indicator to cause magnetic field interference with a permanent magnet installed in the drive shaft.

Here, when the permanent magnet installed in the drive shaft does not cause magnetic field interference between the first magnet member and the second magnet member installed respectively at the upper and lower limit positions, three position signals corresponding to the upper limit position, the lower limit position, and a position of the permanent magnet of the drive shaft may be generated in the control rod position indicator.

Also, a signal for the upper limit position and a reduced lower limit position signal may be generated in the control rod position indicator when destructive interference between the magnetic fields is caused as the permanent magnet installed in the drive shaft approaches the second magnet member installed at the lower limit position, or a signal for the upper limit position and an amplified lower limit position signal may be generated when constructive magnetic field interference is caused between the permanent magnet and the magnet member.

In addition, a signal for the lower limit position and a reduced upper limit position signal may be generated in the control rod position indicator when destructive interference between the magnetic fields is caused as the permanent magnet installed in the drive shaft approaches the first magnet member installed at the upper limit position, or a signal for the lower limit position and an amplified upper limit position signal may be generated when constructive magnetic field interference is caused between the permanent magnet and the magnet member.

Further, the magnet members may be formed in a donut shape in which the magnet members completely surround the protecting tube, or in a semi-donut shape in which the magnet members partially surround the protecting tube.

BRIEF DESCRIPTION OF THE DRAWINGS

The above and other features and advantages of the present invention will become more apparent to those of ordinary skill in the art by describing in detail embodiments thereof with reference to the accompanying drawings, in which.

DETAILED DESCRIPTION OF EMBODIMENTS

Figure 1:
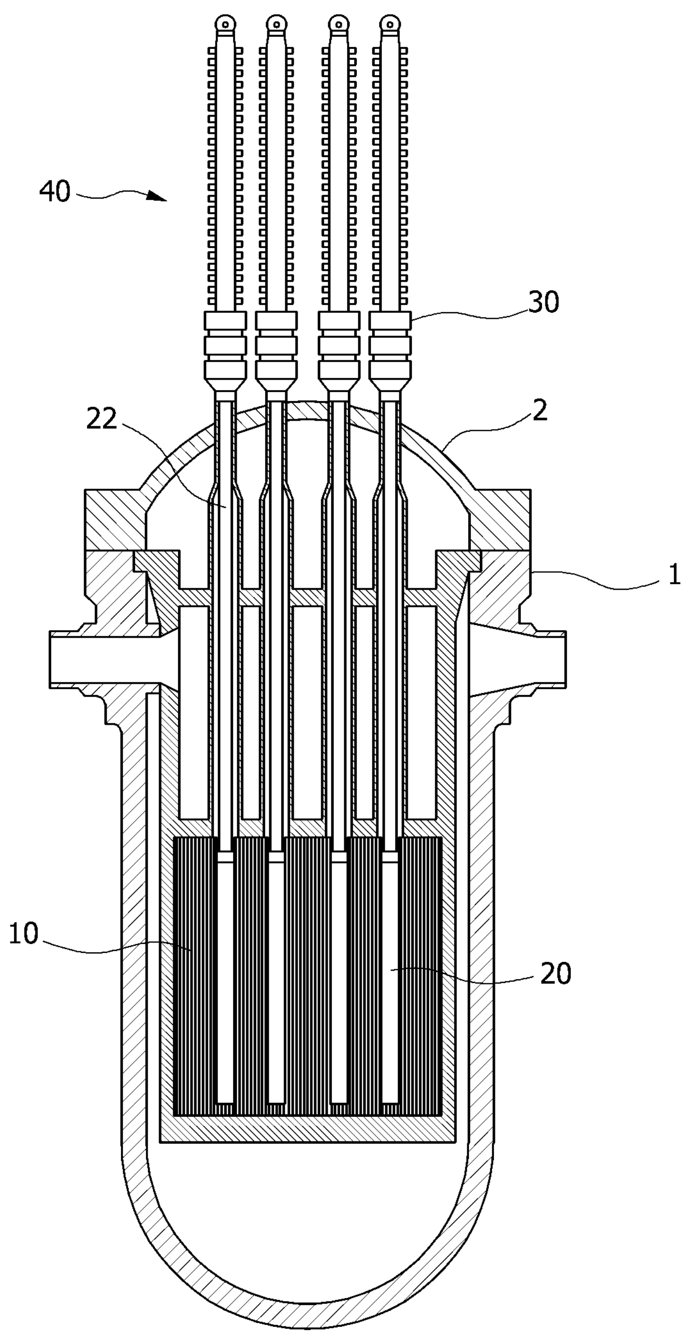
FIG. 1 is a cross-sectional view showing a control rod drive mechanism installed in a nuclear reactor.

Embodiments of the present invention will be described in detail below with reference to the accompanying drawings. While the present invention is shown and described in connection with embodiments thereof, it will be apparent to those skilled in the art that various modifications can be made without departing from the scope of the invention.

Unless specifically stated otherwise, all the technical and scientific terms used in this specification have the same meanings as what are generally understood by a person skilled in the related art to which the present invention belongs. In general, the nomenclature used in this specification and the experimental methods described below is widely known and generally used in the related art.

For power plants, a control rod position indicator provided in a control rod drive mechanism should supply electrical limit signals at upper and lower limit positions at which driving of a control rod assembly is limited. That is, an upper electrical limit (hereinafter referred to as 'UEL') and a lower electrical limit (hereinafter referred to as 'LEL'), and a dropped control rod assembly (dropped CRA) (hereinafter referred to as 'DRC') are supplied in the commercial nuclear power plant, and each of electrical limit signals thereof is as defined below.

First of all, the 'UEL' refers to an electrical limit signal that is turned on when the control rod assembly is fully withdrawn from a position at which the control rod assembly is fully inserted into the reactor core. Here, the control rod assembly is operated at the UEL at or below the maximum height to which the control rod assembly may be withdrawn, and the UEL continues to be turned on when the control rod assembly is withdrawn to a height at or above a height at which the UEL is in a state of being turned on.

Also, the 'LEL' refers to an electrical limit signal that is turned on when the control rod assembly is fully withdrawn to a certain position from a position at which the control rod assembly is completely inserted into the reactor core. In this case, after the LEL is turned on while the control rod assembly is being inserted, the LEL continues to be turned on when the control rod assembly is disposed below the position at which the LEL is turned on.

In addition, the 'DRC' refers to an electrical limit signal that is operated when the control rod assembly is disposed at 0.0 mm from the position at which the control rod assembly is completely inserted into the reactor core. In this case, the DRC is turned on below the position at which the LEL is turned on. Here, the DRC may be differently applied depending on a method of operating the nuclear reactor.

Meanwhile, the control rod position indicator used in nuclear power plants is used in a reed switch method or a measuring coil method, but a method of measuring a position of a control rod using a magnetostrictive wire is proposed.

The method of measuring a position of the control rod using such a magnetostrictive wire is one of the precise position measuring methods used in water level measuring systems, and thus has advantages in that precise measurements are possible, it may be used under high-temperature environments, and two positions may be measured at a time, and thus can be effectively applied to new nuclear reactors.

Figure 2:
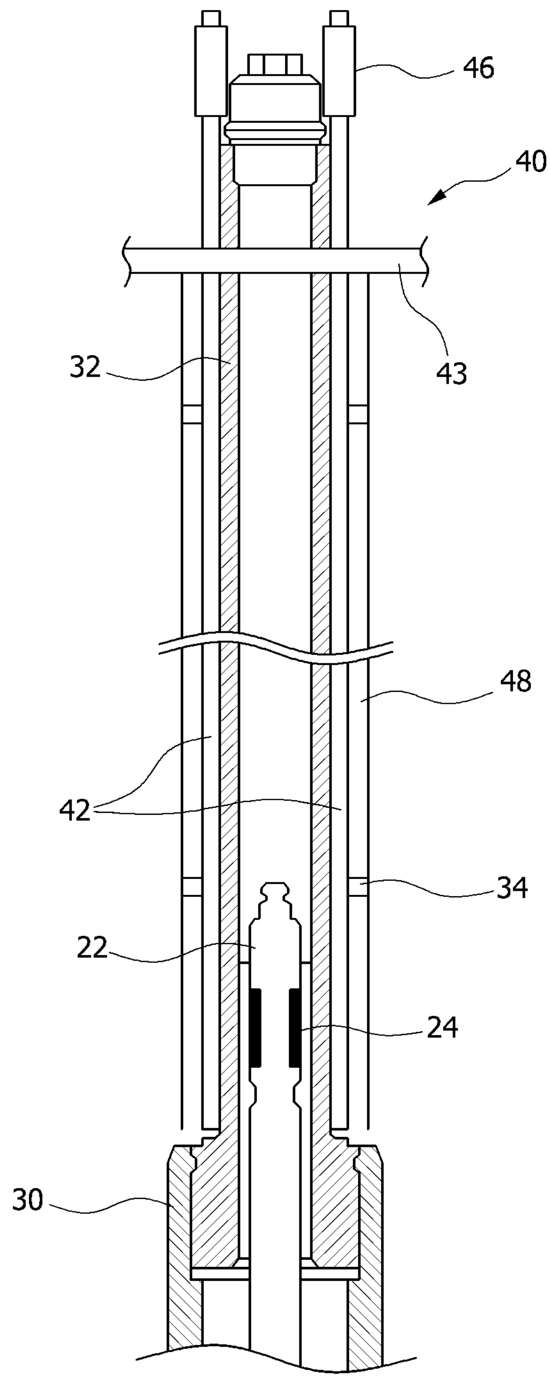
FIG. 2 is a cross-sectional view showing a configuration of main parts of a magnetostrictive wire control rod position indicator installed at a control rod drive mechanism.

FIG. 1 is a diagram showing an example of a control rod drive mechanism installed in a commercial nuclear reactor, and FIG. 2 is a diagram showing a configuration of main parts of a magnetostrictive wire control rod position indicator installed at a control rod drive mechanism.

As shown in FIG. 1, the control rod drive mechanism 30 is installed above a head of a nuclear reactor vessel 1 to drive a control rod 20 configured to control reactivity in a reactor core 10 in a vertical direction.

The control rod drive mechanism 30 is provided with a control rod position indicator 40 configured to measure a real-time position of the control rod 20 as the control rod 20 is driven in a vertical direction.

The control rod position indicator 40 includes a permanent magnet 24 installed in an upper end portion of a drive shaft 22 disposed inside a pressure housing 32 of the control rod drive mechanism 30, and a magnetostrictive wire-type detector 42 fixed at an outer side of the pressure housing 32 through a support structure 34, as shown in FIG. 2.

In addition, the magnetostrictive wire-type detector 42 is provided with a receiving unit 46 disposed above a support member 43, and a support cylinder 48 disposed along the same axis as the pressure housing 32 is installed outside the support structure 34.

According to such a configuration, when a pulse current is applied to a magnetostrictive wire provided in the magnetostrictive wire-type detector 42, a magnetic field is formed around the magnetostrictive wire and propagates along the magnetostrictive wire. As the propagated magnetic field approaches the permanent magnet 24 installed in an upper end of the drive shaft 22, mutual interference between the propagated magnetic field and the magnetic field by the permanent magnet 24 is caused, thereby causing a fine torsional deformation of the magnetostrictive wire.

In this case, torsional elastic waves are generated at the magnetostrictive wire due to the torsional deformation, and the torsional elastic waves propagating along the magnetostrictive wire are received at the receiving unit 46 disposed at an upper end portion of the magnetostrictive wire-type detector 42 to measure a period of time for which the torsional elastic waves have propagated after a pulse current is applied to the magnetostrictive wire. Thereafter, the measured propagation time is calibrated against a propagation velocity of the magnetostrictive wire in an axial line direction to measure an absolute value of a distance between the receiving unit 46 and the permanent magnet 24 of the drive shaft 22, thereby measuring a mechanical position of the control rod 20.

In this case, a measuring range of the magnetostrictive wire control rod position indicator 40 encompasses a drive stroke of the control rod drive mechanism 30, and thus the magnitude of the drive stroke may be determined according to the nuclear reactor. In this case, the control rod drive mechanism 30 should control the control rod 20 so that the control rod 20 is not inserted into a position at or below the maximum insertable position, and should also control the control rod 20 so that the control rod 20 is not withdrawn to or above the maximum withdrawable position.

For this purpose, in the nuclear power plants, reed switches or measuring coils are installed respectively at the maximum insertion position and the maximum withdrawal position of a control rod assembly, and the maximum insertion position and the maximum withdrawal position are measured using a magnetic field of the permanent magnet 24 installed at an upper portion of the drive shaft 22, and are used to control the control rod drive mechanism and used as signals for reactor core protection systems.

However, although the method of measuring a position of the control rod using such a magnetostrictive wire has an advantage in that it has a relatively higher degree of measurement precision compared to the reed switch or measuring coil method, the signals at the upper and lower limit positions of the control rod are not supplied.

As described above, a process of inserting or withdrawing a control rod to/from a reactor core using a control rod drive mechanism so as to control reactivity in the reactor core is needed to control the output of the nuclear reactor. In this case, it is very important to detect a real-time position of the control rod which is driven in a vertical direction.

The magnetostrictive wire control rod position indicator according to one embodiment of the present invention is a measuring system provided to detect a real-time position of the control rod, and thus may precisely measure a real-time position of the control rod using a magnetostrictive wire unlike position measurement methods using a conventional reed switch or a measuring coil.

Also, the magnetostrictive wire control rod position indicator according to one embodiment of the present invention may also provide signals for an upper limit position and a lower limit position that are vertical drive limits of the control rod when the control rod is driven.

Hereinafter, a configuration of main parts of the magnetostrictive wire control rod position indicator according to one embodiment of the present invention, which provides signals for upper and lower limit positions that are vertical drive limits of the control rod in a structure of the above-described conventional magnetostrictive wire control rod position indicator, will be mainly described with reference to the accompanying drawings.

Figure 3:
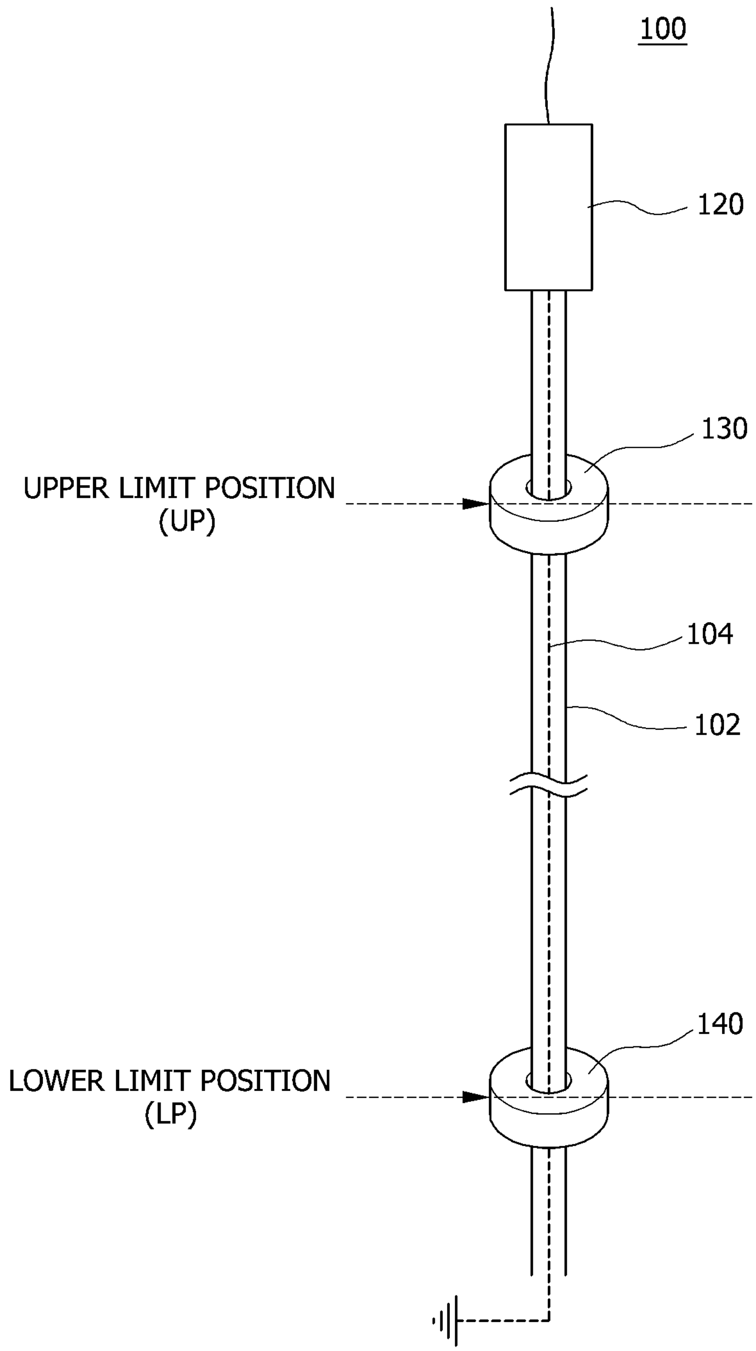
FIG. 3 is a configuration diagram showing a configuration of main parts of a magnetostrictive wire control rod position indicator according to one embodiment of the present invention.
Figure 4:
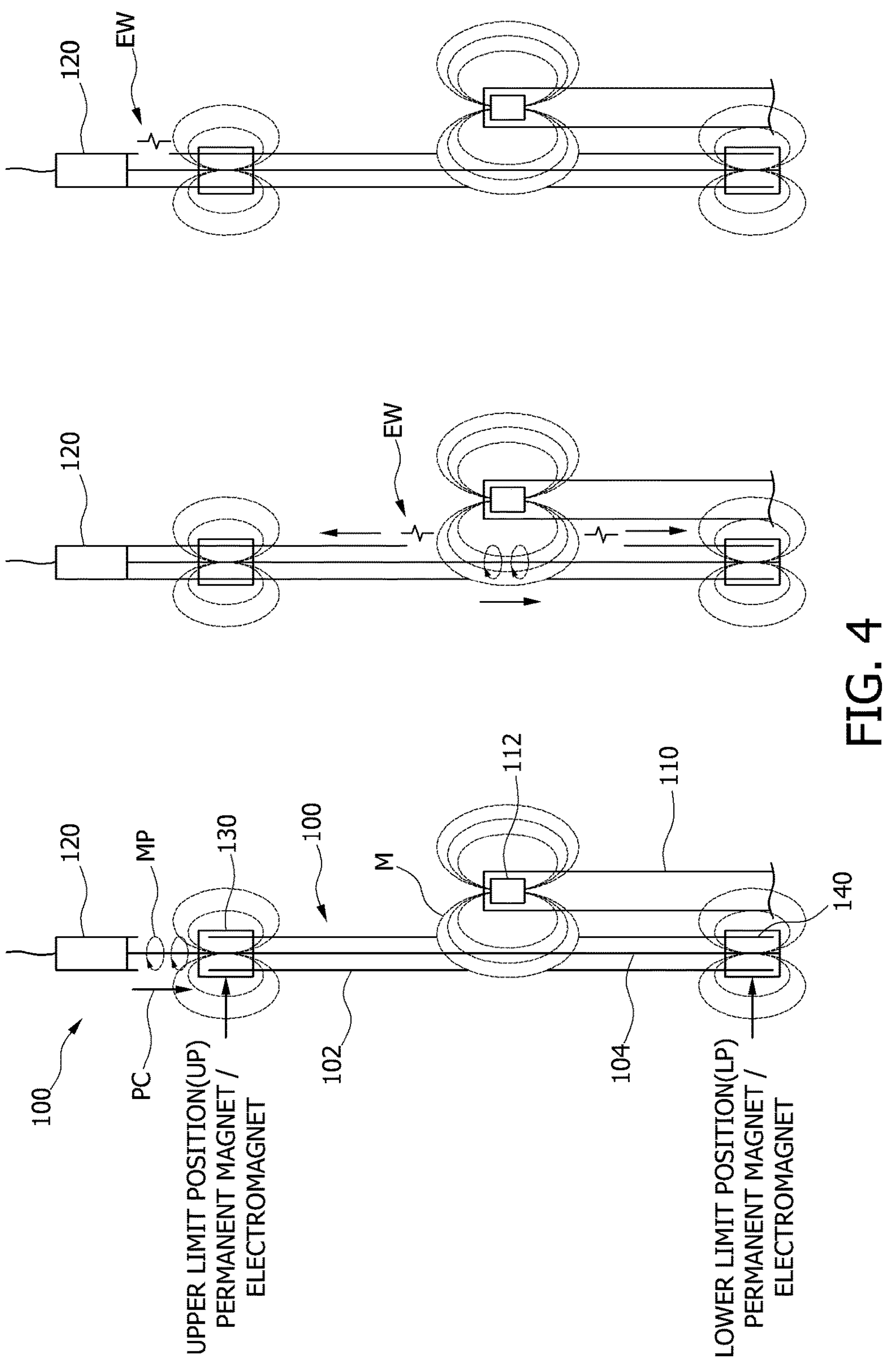
FIG. 4 is an operational state diagram for describing a method of detecting a position of a control rod based on the magnetic field interference between magnet members installed at upper and lower limit positions of the control rod position indicator and a permanent magnet installed at a control rod drive shaft.

FIG. 3 is a configuration diagram showing a configuration of main parts of the magnetostrictive wire control rod position indicator according to one embodiment of the present invention, and FIG. 4 is an operational state diagram for describing a method of detecting a position of a control rod based on the magnetic field interference between magnet members installed at upper and lower limit positions of the control rod position indicator and a permanent magnet installed at a control rod drive shaft.

Referring to FIGS. 3 and 4, the magnetostrictive wire control rod position indicator 100 according to one embodiment of the present invention includes a magnetostrictive wire 104 provided inside a cylindrical protecting tube 102 made of a stainless steel material.

Here, the term "magnetostriction" refers to a situation in which the outer shape of a magnetic material is changed when the ferromagnetic material is magnetized, indicating that a force is generated at a point where a magnetic field is applied to a ferromagnetic material in which a pulse current flows according to the Fleming's left-hand rule, and thus acts on the ferromagnetic material as torsional stress to finely deform the ferromagnetic material. The torsion of such a ferromagnetic material propagates along the ferromagnetic material at a supersonic speed in the form of mechanical vibrations (strain pulses).

In the magnetostrictive wire control rod position indicator 100 according to embodiments of the present invention, torsional deformation of the magnetostrictive wire is induced by interference between a magnetic field formed by supplying a pulse current PC to the magnetostrictive wire 104 made of a ferromagnetic material and a magnetic field formed by the permanent magnet installed at an upper portion of the control rod drive shaft, and torsional elastic waves generated by the torsional deformation are detected to measure a real-time position of the control rod. For this purpose, a receiving unit 120 capable of detecting the torsional elastic waves EW generated upon the torsional deformation of the magnetostrictive wire 104 is provided at an upper portion of the control rod position indicator 100.

Meanwhile, in the magnetostrictive wire control rod position indicator 100 according to one embodiment of the present invention, magnet members 130 and 140 configured to cause magnetic field interference with the permanent magnet 112 installed at the control rod drive shaft are provided at an upper limit position UP and a lower limit position LP that are upper and lower limits at which an operation thereof is limited when the control rod is driven in a vertical direction.

The upper limit position UP and the lower limit position LP set in the magnetostrictive wire control rod position indicator 100 are upper and lower limit positions at which the vertical drive limits of a control rod assembly are limited. Here, the upper limit position UP refers to the maximum withdrawable position to which the control rod assembly is withdrawn upwards, and the lower limit position LP refers to the maximum insertable position to which the control rod assembly is inserted downwards.

Also, permanent magnets or electromagnets may be used as the first magnet member 130 and second magnet member 140 installed respectively at the upper and lower limit positions UP and LP of the magnetostrictive wire control rod position indicator 100.

In this case, the magnet members 130 and 140 used as the permanent magnets or electromagnets may be formed in a donut shape in which the magnet members 130 and 140 completely surround the protecting tube 102 of the control rod position indicator 100, or in a semi-donut shape in which the magnet members 130 and 140 partially surround the protecting tube 102, and may be applied in various shapes in which the magnet members 130 and 140 may cause magnetic field interference with the permanent magnet 112.

FIG. 4 is a diagram for schematically describing a method of detecting a position of the control rod and supplying signals for upper and lower limit positions using magnetic field interference between the magnet members 130 and 140, which are installed respectively at the upper and lower limit positions UP and LP of the magnetostrictive wire control rod position indicator 100 according to one embodiment of the present invention, and the permanent magnet 112 installed at the control rod drive shaft 110.

First, the method of detecting a position of the control rod using the magnetostrictive wire will be described. As shown in FIG. 4, when a pulse current PC is allowed to flow in the magnetostrictive wire 104 provided inside the protecting tube 102 of the magnetostrictive wire control rod position indicator 100, a magnetic field is formed around the magnetostrictive wire 104 made of a ferromagnetic material, and propagates downwards along the magnetostrictive wire 104.

Next, when the magnetic field which has propagated downwards along the magnetostrictive wire 104 approaches the permanent magnet 112 installed in an upper end of the drive shaft 110 of the control rod drive mechanism, a magnetic field MP formed around the magnetostrictive wire 104 and a magnetic field M formed by the permanent magnet 112 of the drive shaft 110 interfere with each other, and thus fine torsional deformation of the magnetostrictive wire 104 made of a ferromagnetic material is caused. The torsion of such a magnetostrictive wire 104 is converted into the form of mechanical vibrations, thereby generating torsional elastic waves EW.

Also, the torsional elastic waves propagating along the magnetostrictive wire 104 are received at the receiving unit 120 disposed at an upper end portion of the magnetostrictive wire control rod position indicator 100 to measure a period of time for which the torsional elastic waves EW have propagated after the pulse current is applied to the magnetostrictive wire 104. Thereafter, the measured propagation time is calibrated against a propagation velocity of the magnetostrictive wire 104 in an axial line direction to measure an absolute value of a distance between the receiving unit 120 and the permanent magnet 112 of the drive shaft 110, thereby measuring a real-time mechanical position of the control rod.

The method of detecting a position of the control rod using such a magnetostrictive wire 104 is described in detail in the above, and thus a specific description thereof is omitted.

Meanwhile, the magnetostrictive wire control rod position indicator 100 according to one embodiment of the present invention always generates signals for the upper limit position UP and the lower limit position LP using a magnetic field interference effect between the magnet members 130 and 140 installed at the upper limit position UP and the lower limit position LP and the permanent magnet 112 installed in an upper end of the control rod drive shaft 110 when the control rod is being driven in a vertical direction.

In this case, during the vertical driving of the control rod, the signals detected by the control rod position indicator 100 are divided into three signals according to a change in position of the permanent magnet 112 disposed in an upper end of the control rod drive shaft 110.

As the first case, when the magnetic field interference between the permanent magnet 112 installed in the drive shaft 110 and the magnet members 130 and 140 installed respectively at the upper limit position UP and the lower limit position LP of the control rod position indicator 100 is not caused since the permanent magnet 112 is spaced far away from the magnet members 130 and 140, three position signals corresponding to the upper limit position UP, the lower limit position LP, and a position of the permanent magnet 112 of the drive shaft 110 are generated in the control rod position indicator 100.

As the second case, when the control rod is inserted into the reactor core, and thus the permanent magnet 112 installed in an upper portion of the drive shaft 110 causes destructive interference between magnetic fields thereof and the second magnet member 140 installed at the lower limit position LP of the control rod position indicator 100, a magnetostriction having a size less than or equal to a predetermined size is measured in the magnetostrictive wire control rod position indicator 100. In this case, it could be seen that a position signal corresponding to the upper limit position UP and a reduced lower limit position signal are generated in the magnetostrictive wire control rod position indicator 100, and thus the permanent magnet 112 is disposed at the lower limit position LP.

Alternatively, when a polar arrangement of the permanent magnet 112 or the second magnet member 140 varies, the magnetic fields formed by the second magnet member 140 and the permanent magnet 112 constructively interfere with each other to generate a position signal corresponding to the upper limit position UP and an amplified lower limit position signal in the control rod position indicator 100. As a result, it could also be seen that the permanent magnet 112 is disposed at the lower limit position LP.

As the third case, when the control rod is withdrawn, and thus the permanent magnet 112 installed at an upper portion of the drive shaft 110 causes destructive interference between the magnetic fields thereof and the first magnet member 130 installed at the upper limit position UP of the magnetostrictive wire control rod position indicator 100, a magnetostriction having a size less than or equal to a predetermined size is measured in the control rod position indicator 100. In this case, it could be seen that a position signal corresponding to the lower limit position LP and a reduced upper limit position signal are generated in the magnetostrictive wire control rod position indicator 100, and thus the permanent magnet 112 is disposed at the upper limit position UP.

Alternatively, when a polar arrangement of the permanent magnet 112 or first magnet member 130 varies, the magnetic fields formed by the first magnet member 130 and the permanent magnet 112 constructively interfere with each other to generate a position signal corresponding to the lower limit position LP and an amplified upper limit position signal in the magnetostrictive wire control rod position indicator 100. As a result, it could also be seen that the permanent magnet 112 is disposed at the upper limit position UP.

As described above, a change in a position signal of the control rod which is changed according to a real-time position thereof when the control rod is driven in a vertical direction may be sensed to detect the upper limit position UP and the lower limit position LP of the control rod, thereby effectively limiting an operation of the control rod drive mechanism.

In this case, the upper limit position UP and the lower limit position LP of the control rod position indicator 100 may be set so that the upper limit position UP and the lower limit position LP are adjusted at a worksite depending on the position of the control rod installed in the nuclear reactor.

Also, the magnetostrictive wire control rod position indicator 100 according to one embodiment of the present invention may include a combination of the magnetostrictive wire control rod position indicator 100 for detecting the upper limit position UP and the lower limit position LP and the magnetostrictive wire control rod position indicator for detecting a position of a conventional control rod as one integrated device, or may include the control rod position indicators as separate devices.

Embodiments of the present invention have advantages in that a position of a control rod used in a non-nuclear safety control system and a reactor core protection system of a nuclear reactor can be precisely measured by supplying signals for an upper limit position and a lower limit position of the control rod in the conventional magnetostrictive wire control rod position indicator.

Also, embodiments of the present invention have advantages in that it can be efficiently used in commercial nuclear power plants and small modular reactors (SMRs) as the position of the control rod can be precisely measured as described above.

Further, embodiments of the present invention have advantages in that it can be very effective in implementing a control rod drive mechanism mounted in the nuclear reactor as the magnetostrictive wire-type control rod position indicator usable at a high temperature is precisely implemented.

It will be apparent to those skilled in the art that various modifications can be made to the above-described embodiments of the present invention without departing from the scope of the invention. Thus, it is intended that the present invention covers all such modifications provided they come within the scope of the appended claims and their equivalents.

What is claimed is:

1. A control rod apparatus, comprising:

a control rod movable in a vertical direction between a control rod upper limit and a control rod lower limit;

a drive shaft extending along the vertical direction and coupled to the control rod at an end thereof, wherein the drive shaft is configured to move between two locations in the vertical direction, which causes the control rod to move between the control rod upper limit and the control rod lower limit in the vertical direction;

a magnetostrictive wire tube extending along the vertical direction adjacent to the drive shaft, wherein the magnetostrictive wire tube comprises a magnetostrictive wire extending along the vertical direction;

a drive shaft magnet fixed to the drive shaft at a point thereof in the vertical direction, wherein, the drive shaft magnet is configured to move between a magnet upper limit and a magnet lower limit as the control rod moves between the control rod upper limit and the control rod lower limit in the vertical direction;

an upper limit magnet fixed to the magnetostrictive wire tube at a first point thereof corresponding to the magnet upper limit in the vertical direction;

a lower limit magnet fixed to the magnetostrictive wire tube at a second point thereof corresponding to the magnet lower limit in the vertical direction; and a detector configured to send pulse currents to the magnetostrictive wire and to receive responsive signals returned in the magnetostrictive wire in response to the pulse currents, wherein the upper limit magnet, the lower limit magnet, and the drive shaft magnet are together configured to cause the responsive signals in the magnetostrictive wire, wherein, when the detector sends a single pulse current to the magnetostrictive wire while the control rod is located at neither the control rod upper limit nor the control rod lower limit, the upper limit magnet causes a responsive signal, the lower limit magnet causes a responsive signal, and the drive shaft magnet causes a responsive signal, wherein, when the detector sends a single pulse current to the magnetostrictive wire while the control rod is located at the control rod upper limit or the control rod lower limit, the upper limit magnet causes a responsive signal and the lower limit magnet causes a responsive signal, and the drive shaft magnet does not generate another responsive signal, wherein the detector is configured to determine that the control rod is located at a position between the control rod upper limit and the control rod lower limit when the detector receives three responsive signals corresponding to the upper limit magnet, the lower limit magnet, and the drive shaft magnet, wherein the detector is configured to determine that the control rod is located at either the control rod upper limit or the control rod lower limit when the detector receives only two responsive signals corresponding to the upper limit magnet and the lower limit magnet.

2. The apparatus of claim 1, wherein the responsive signal caused by the upper limit magnet when the control rod is located at the control rod upper limit differs from the responsive signal caused by the upper limit magnet when the control rod is not located at the control rod upper limit, wherein the detector is configured to determine whether the control rod is located at the control rod upper limit based on a difference between responsive signals caused by the upper limit magnet.

3. The apparatus of claim 2, wherein the drive shaft magnet is configured to provide magnetic interference to the upper limit magnet when the control rod is located at the control rod upper limit such that the responsive signal caused by the upper limit magnet when the control rod is located at the control rod upper limit differs from the responsive signal caused by the upper limit magnet when the control rod is not located at the control rod upper limit.

4. The apparatus of claim 1, wherein the responsive signal caused by the lower limit magnet when the control rod is located at the control rod lower limit differs from the responsive signal caused by the lower limit magnet when the control rod is not located at the control rod lower limit, wherein the detector is configured to determine whether the control rod is located at the control rod lower limit based on a difference between responsive signals caused by the lower limit magnet.

5. The apparatus of claim 4, wherein the drive shaft magnet is configured to provide magnetic interference to the lower limit magnet when the control rod is located at the control rod lower limit such that the responsive signal caused by the lower limit magnet when the control rod is located at the control rod lower limit differs from the responsive signal caused by the lower limit magnet when the control rod is not located at the control rod lower limit.

6. The apparatus of claim 1, wherein the responsive signal caused by the upper limit magnet when the control rod is located at the control rod upper limit differs from the responsive signal caused by the upper limit magnet when the control rod is not located at the control rod upper limit, wherein the responsive signal caused by the lower limit magnet when the control rod is located at the control rod lower limit differs from the responsive signal caused by the lower limit magnet when the control rod is not located at the control rod lower limit, wherein the detector is configured to determine whether the control rod is located at the control rod upper limit or the control rod lower limit based on a difference between responsive signals caused by the upper limit magnet and a difference between responsive signals caused by the lower limit magnet.

* * * * *